United States Patent Office 3,576,801
Patented Apr. 27, 1971

3,576,801
PROCESS OF PRODUCING 6-STYRYL-5,6-DIHYDRO-α-PYRONE COMPOUNDS
Hans Brinkhoff, Munich, Germany, assignor to Spezialchemie Gesellschaft mit beschrankter Haftung und Co., Arzneimittelfabrik, Munich, Germany
No Drawing. Filed Dec. 5, 1967, Ser. No. 690,729
Claims priority, application Germany, Dec. 20, 1966, S 107,503, S 107,504
Int. Cl. C07d 7/10
U.S. Cl. 260—240                                       22 Claims

ABSTRACT OF THE DISCLOSURE 6-styryl-5,6-dihydro-α-pyrone compounds such as kawain and methysticin are produced by condensing γ-halogeno-β-alkoxy crotonic acid esters with cinnamic aldehyde or its acetal or alkoxy- or methylenedioxy-substituted cinnamic aldehyde or acetal in the presence of metallic zinc. When decomposing the resulting organo-zinc salt by a treatment with a dilute mineral acid, preferably 10% hydrochloric acid, the α-pyrone compounds are obtained in a surprisingly high yield.

Preferably the starting γ-halogeno-β-alkoxy crotonic acid ester is obtained by brominating β-alkoxy crotonic acid ester with a brominating imido compound such as N-bromo succinimide or 1,3-dibromo-5,5-dimethyl hydantoin in the absence of a solvent at a temperature exceeding 100° C., preferably at 105–115° C. The succinimide or dimethyl hydantoin formed thereby is completely removed from the γ-bromo-β-alkoxy crotonic acid ester by extraction of a solvent wherein the imido compounds are soluble but not the bromo compound. The bromo compound need not be dried and can directly be purified by vacuum distillation. The yield is almost quantitative. Water is the preferred solvent.

BACKGROUND OF INVENTION

The present invention relates to an improved process of producing kawain and substitution products of kawain such as methysticin.

It is known to produce kawain and the like α-pyrone compounds by reacting γ-halogen-β-alkoxy crotonic acid alkyl esters with cinnamic aldehyde or, respectively, with methylenedioxy cinnamic aldehyde in the presence of zinc. Preferably γ-bromo- or γ-chloro-β-alkoxy crotonic acid alkyl esters in which alkyl or the alkoxy group and of the alkyl ester group contains one or two carbon atoms are used as starting material. Such processes are described, for instance, with respect to the synthesis of kawain, by Kostermanns in "Recueil" vol. 70 (1951), pages 79 to 82, and, with respect to the synthesis of methysticin, in U.S. Pat. No. 2,870,164. When proceeding according to the known processes, the condensation by means of zinc proceeds by way of the addition of an organo metal compound to a carbonyl group in an inert solvent such as ether, benzene, toluene, tetrahydrofuran, and others. The yield of kawain or methysticin, however, is very low and does not exceed about 40%.

The preparation of γ-bromo-β-alkoxy crotonic acid alkyl esters of the formula

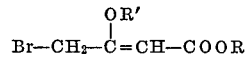

in which R and R' are lower alkyl, especially alkyl with one or two carbon atoms, is known, for instance, from "Nature" vol. 166, page 788 (1950). According to this publication 25 g. of aceto acetic acid ester ethyl ester are methylated by reaction with a large excess of ethereal diazomethane solution for three days. Thereby, an 80% β-methoxy crotonic acid ethyl ester is obtained in a yield of about 40%. Said β-methoxy crotonic acid ethyl ester is brominated by means of N-bromo succinimide and yields γ-bromo-β-methoxy crotonic acid ethyl ester of a purity of about 80% in a yield of about 60%. When using the aceto acetic acid methyl ester, the yield or γ-bromo-β-methoxy crotonic acid methyl ester are even lower. The low yield is caused by the fact that part of the alkoxy crotonic acid alkyl ester attaches the bromine in α-position and another part of said ester in γ-position. Due thereto purification of the brominated ester is rendered very difficult.

Kostermanns discloses in "Recueil" vol. 70 (1951), page 81 a process of producing γ-bromo-β-methoxy crotonic acid ethyl ester for the hereinabove described kawain synthesis, whereby 25 g. of β-methoxy crotonic acid ethyl ester are dissolved in 75 ml. of freshly distilled, water-free carbon tetrachloride. The theoretical amount of N-bromo succinimide (31 g.) is added to said solution. Vigorous reaction sets in spontaneously after a certain period of time. As soon as the reaction has ceased, the reaction mixture is stirred for 3½ hours. The reaction mixture is then cooled in ice, filtered, and washed with water-free, ice-cooled carbon tetrachloride. The combined filtrate and wash solvents are evaporated to dryness in a vacuum and the residue is subjected to fractional distillation.

The fraction distilling between 117° C./30 mm. Hg and 140° C./30 mm. Hg in the amount of 22.8 g. is collected and again subjected to fractional distillation. The fraction distilling at 134–139° C./30 mm. Hg is collected and used in the above described condensation with cinnamic aldehyde or its substitution products. Pure γ-bromo-β-methoxy crotonic acid ethyl ester is obtained in a yield of only 30–32%. The distillation residue in the distillation flask decomposes very rapidly.

The overall yield of kawain and methysticin produced in the known manner from aceto acetic acid alkyl esters thus is very low and amounts to not more than about 40%. Thus it is not possible to produce kawain, methysticin, and other pharmacologically useful α-pyrone compounds in an economical manner.

SUMMARY OF INVENTION

It is one object of the present invention to provide a simple and effective process of producing kawain, methysticin, and other pharmacologically useful α-pyrone compounds in a surprisingly high yield and of a high degree of purity.

Another object of the present invention is to provide a simple and effective process o fhalogenating β-alkoxy crotonic acid alkyl esters to the corresponding γ-halogeno-β-alkoxy crotonic acid alkyl esters, also in a surprisingly high yield and of a high degree of purity.

Other objects of the present invention and advantageous features thereof will become apparent as the description proceeds.

In principle the process according to the present invention comprises the following steps:

(1) Bromination of β-alkoxy crotonic acid esters by means of brominating imido compounds, preferably of N-bromo succinimide or 1,3-dibromo-5,5-dimethyl hydantoin yields γ-bromo-β-alkoxy crotonic acid esters in a surprisingly high yield, namely in an almost quantitative yield when operating (a) in the absence of solvents and
(b) at a temperature exceeding 100° C. and preferably at 105–115° C.

(2) Reaction of the resulting γ-bromo-β-alkoxy crotonic acid ester with cinnamic aldehyde or cinnamic acetal which may be substituted, for instance, by alkoxy groups or the methylenedioxy group, in the presence of zinc and decomposition of the zincate in the reaction mixture by means of dilute mineral acid such as hydrochloric acid, preferably of 10% hydrochloric acid. The yield of the resulting α-pyrone compound is also very high and amounts to 90% and even more.

Of course, decomposition of the zincate with dilute hydrochloric acid may also be carried out with a γ-bromo-β-alkoxy crotonic acid ester obtained in another manner than described hereinabove. However, an overall yield of about 90% of the α-pyrone compound starting wtih β-alkoxy crotonic acid ester is obtained when brominating the β-alkoxy crotonic acid ester according to the present invention as described hereinabove under (1).

The α-pyrone compounds obtained by the specific procedures of the present invention correspond to the following formula.

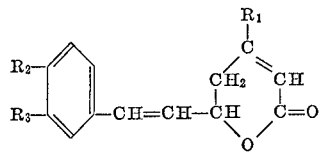

In said formula $R_1$ is alkoxy, preferably lower alkoxy, and
$R_2$ and $R_3$ are hydrogen, alkoxy, preferably lower alkoxy, or $R_2$ and $R_3$ form the methylene dioxy group.
Preferably alkyl in the substituents $R_1$, $R_2$, and $R_3$ are methyl.

The theory is advanced although the invention is by no means limited to such a theoretical explanation that substantially complete absence of the formed imido compound such as succinimide or, respectively, dimethyl hydantoin during distillation of the resulting γ-bromo-β-alkoxy crotonic acid ester is responsible for the surprisingly high, i.e. almost quantitative yield of said γ-bromo-β-alkoxy crotonic acid ester. This theory is supported by the fact that, as has been found, succinimide or, respectively, dimethyl hydantoin cause decomposition, on distillation, of γ-halogeno-β-alkoxy crotonic acid esters such as γ-bromo-β-alkoxy crotonic acid esters.

It has been found that the formed imido compound, i.e. succinimide or, respectively 5,5-dimethyl hydantoin can be quantitatively removed from the hot reaction solution by extraction with suitable solvent which are capable of dissolving the imido compound but do not dissolve the γ-bromo-β-alkoxy crotonic acid esters, preferably with water. By such a water extraction of the reaction mixture not even traces of the succinimide or dimethylhydantoin remain in the γ-bromo-β-alkoxy crotonic acid ester. Such complete separation of the imido compound was not possible heretofore even if the reaction mixture was cooled to a temperature as low as —20° C.

Reaction of the γ-halogeno-β-alkoxy crotonic acid ester with cinnamic aldehyde or cinnamic acetal which may be substituted, in the presence of zinc proceeds almost quantitatively. However, decomposition of the resulting organo-zinc compound as carried out heretofore very considerably reduced the final yield.

This loss in yield on decomposing the organo-zinc compound as observed in the known processes is considerably reduced and even completely eliminated when shaking the reaction mixture with a dilute mineral acid, such as 10% hydrochloric acid. Thereby, the α-pyrone compound precipitates immediately from the reaction solution and the yield and purity of the precipitated α-pyrone compounds, for instance, of 4-methoxy-6-styryl-5,6-dihydro-α-pyrone, i.e. kawain, or of 4 - methoxy - 6 - (3,4 methylenedioxy styryl) - 5,6 - dihydro-α-pyrone, i.e. methysticin are very high. The decomposition reaction can be carried out in a very simple manner because no extracting agent need be added. Although dilute hydrochloric acid has proved to be especially suitable, other dilute mineral acids such as dilute sulfuric acid, hydrobromic acid may also be used.

According to a preferred embodiment of the pesent invention the reaction mixture of γ-bromo-β-alkoxy crotonic acid ester and the respective cinnamic aldehyde compound is cooled, for instance, to about 40–45° C. and is then poured in a thin stream into the dilute mineral acid, for instance, into 10% hydrochloric acid.

It has been found that the concentration of the mineral acid, such as hydrochloric acid should not substantially exceed 10%. However, a mineral acid concentration below 5% should not be used because it retards precipitation of the α-pyrone reaction product.

The theory is advanced that the previously encountered low yield of the α-pyrone condensation product were caused by the unfavorable action of zinc bromide on the condensation product. This detrimental effect of zinc bromide is eliminated when treating and decomposing the reaction mixture with dilute mineral acid because it completely eliminates and removes any zinc bromide from the reaction mixture. This has the further advantage that it is possible to use for the condensation zinc metal which has not been specifically purified. Any technical grade of zinc can be used in the condensation reaction when subsequently treating the condensation mixture with a dilute mineral acid.

A further advantage of the process according to the present invention is that it is not necessary to use iodine-activated zinc in each condensation batch. It has been found that it is sufficient to use an iodine-activated zinc for the first starter condensation reaction only. The unreacted zinc remaining in the reaction vessel after the first condensation reaction has an activating effect upon the freshly added zinc used in subsequent condensations.

DETAILED DESCRIPTION OF THE INVENTION

The following examples serve to illustrate the present invention without, however, limiting the same thereto.

EXAMPLE 1

Preparation of kawain

Reaction equation:

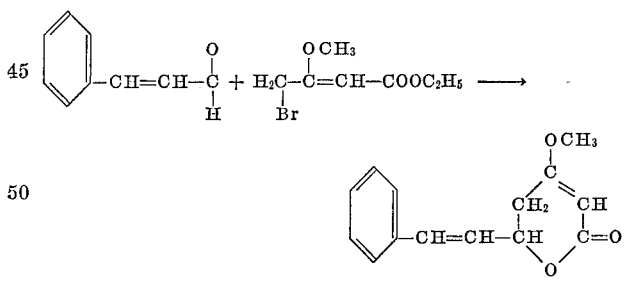

(a) 15.0 kg. of β-methoxy crotonic acid ethyl ester are heated to 110° C. 15.0 kg. of N-bromo succinimide are added portion by portion thereto while stirring vigorously. Care is taken by heating the reaction mixture that the bromination temperature does not decrease below 100° C. for a prolonged period of time. After bromination is completed, the mixture is allowed to cool to about 70–80° C. 25.0 l. of water are added thereto and the mixture is stirred to yield tn emulsion. As a result thereof most of the succinimide formed during bromination is dissolved in the aqueous phase which is separated from the remaining bromination product. The residue is washed two to three times with water to completely eliminate the succinimide from the bromination product. After separation of the aqueous succinimide solution and the wash waters, the residue is distilled in a vacuum without drying. The first runnings consist almost completely of water and unreacted β-methoxy crotonic acid ethyl ester. The main fraction consists of 17.8 kg. of γ-bromo-β-methoxy crotonic acid ethyl ester. The yield is about 95% calculated for N-bromo succinimide.

(b) Said freshly distilled 17.8 kg. of γ-bromo-β-methoxy crotonic acid ethyl ester are mixed with 10.5 kg. of cinnamic aldehyde and 25.0 l. of benzene. The solution is poured slowly upon 6.0 kg. of technical grade zinc. While initially heat is supplied, the reaction soon proceeds without heating. After one hour the temperature of the mixture is kept at 80° C. for two hours. Thereafter, the mixture is allowed to cool to 40–45° C. and is transferred by suction to remove unreacted zinc in a thin stream into 50 l. of an aqueous 10% hydrochloric acid solution. Kawain precipitates spontaneously. It is filtered off and washed twice with 10% hydrochloric acid solution to completely remove the zinc salts. 15.8 kg. of crude kawain are obtained. The yield is about 86% calculated for cinnamic aldehyde. After recrystallization from methylene chloride, chloroform, carbon tetrachloride, or methanol there are obtained 14.85 kg. of pure kawain of the melting point 148° C. The yield, calculated for charged β-methoxy crotonic acid ethyl ester is about 86%.

In place of β-methoxy crotonic acid ethyl ester, there may be reacted the equivalent amount of β-methoxy crotonic acid methyl ester while otherwise the procedure is the same as described hereinabove under (a).

In place of benzene used as solvent in condensation step (b), there may be employed other inert organic solvents such as toluene, tetrahydrofuran, and the like.

The zinc used for the starter batch is iodine-activated zinc. In subsequent condensation batches the zinc need not be iodine-activated.

It may be pointed out, that an amount of brominating agent which is smaller than the theoretically required amount, is added for brominating the β-alkoxy crotonic acid ester. Preferably only 70% to 90% of the equimolecular amount is used so that the β-alkoxy crotonic acid ester is always in excess.

EXAMPLE 2

Preparation of methysticin

Reaction equation:

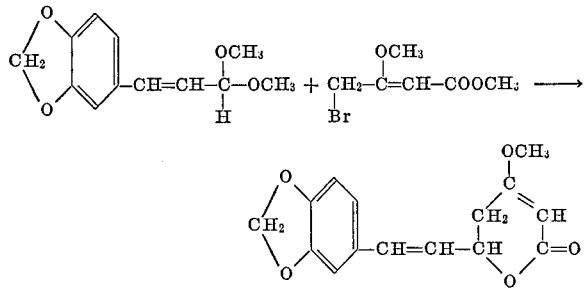

(a) 16.0 kg. of β-methoxy crotonic acid methyl ester are heated to 115° C. 10.0 kg. of 1,3-dibromo-5,5-dimethyl hydantoin are added portion by portion thereto while stirring vigorously and keeping the temperature between 105° C. and 115° C. The reaction mixture is then worked up by proceeding as described in Example 1(a). The yield of γ-bromo-β-methoxy crotonic acid methyl ester is 14.8 kg. corresponding to about 96% calculated for 1,3-dibromo-5,5-dimethyl hydantoin.

(b) Said 14.8 kg. of γ-bromo-β-methoxy crotonic acid methyl ester are mixed with 15.0 kg. of 3,4-methylenedioxy cinnamic dimethyl acetal and 40.01 of toluene. The solution is slowly poured on 8.0 kg. of zinc. Further working up of the reaction mixture is carried out as described in Example 1(b). Thereby, 16.8 kg. of 4-methoxy-6-(3,4-methylenedioxy styryl)-5,6-dihydro-α-pyrone, i.e. methylsticin are obtained. The yield is 91.0% calculated for 3,4-methylenedioxy cinnamic dimethyl acetal. On recrystallization from methanol the melting point is 134° C.

In place of dilute hydrochloric acid as agent for decomposing the zincate formed, there may be used other dilute mineral acids such as dilute sulfuric acid, hydrobromic acid.

I claim:
1. In a process of producing a 6-styryl-5,6-dihydro-4-alkoxy-α-pyrone compound of the formula

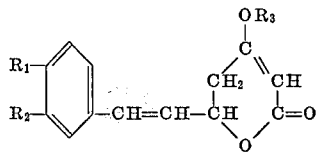

wherein
$R_1$ and $R_2$ are members selected from the group consisting of hydrogen, the lower alkoxy group, and the methylenedioxy group and
$R_3$ is lower alkyl, by reacting a γ-halogeno-β-alkoxy-crotonic acid ester in an inert organic solvent with a cinnamic aldehyde of the formula

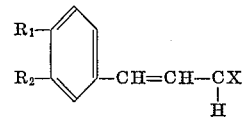

wherein
$R_1$ and $R_2$ are the same substituents as indicated above and
X is a member selected from the group consisting of oxygen and the acetal group

wherein $R_3$ is lower alkyl,
in the presence of metallic zinc, decomposing the resulting organo-zinc salt, and separating the resulting 6-styryl-5,6-dihydro-4-alkoxy-α-pyrone compound, the improvement which consists in decomposing the organo-zinc salt by adding the reaction mixture to an aqueous dilute mineral acid of a mineral acid concentration not substantially exceeding 10%, while stirring, thereby precipitating the resulting 6-styryl,5,6-dihydro-4-alkoxy-α-pyrone compound.

2. The process according to claim 1, wherein the γ-halogen-β-alkoxy crotonic acid ester is γ-bromo-β-methoxy crotonic acid ethyl ester.

3. The process according to claim 1, wherein the γ-halogeno-β-alkoxy crotonic acid ester is γ-bromo-β-methoxy crotonic acid methyl ester.

4. The process according to claim 1, wherein the cinnamic aldehyde compound is cinnamic aldehyde.

5. The process according to claim 1, wherein the cinnamic aldehyde compound is 3,4-methylenedioxy cinnamic aldehyde.

6. The process according to claim 1, wherein the cinnamic aldehyde compound is cinnamic dimethyl acetal.

7. The process according to claim 1, wherein the cinnamic aldehyde compound is 3,4-methylenedioxy cinnamic dimethyl acetal.

8. The process according to claim 1, wherein the dilute mineral acid is aqueous dilute hydrochloric acid.

9. The process according to claim 1, wherein the dilute mineral acid is aqueous about 10% hydrochloric acid.

10. The process according to claim 1, wherein the metallic zinc is technical grade zinc.

11. The process according to claim 1, wherein the reaction mixture containing the organo-zinc salt is allowed to run into the dilute mineral acid solution in a thin stream while stirring.

12. The process of claim 1, wherein the starting γ-halogeno-β-alkoxy crotonic acid ester is obtained by
(a) reacting a β-alkoxy crotonic acid ester with a brominating imido compound selected from the group consisting of N-bromo succinimide and 1,3-dibromo-5,5-dimethyl hydantoin in the absence of a solvent at a temperature above 100° C.

(b) extracting the formed imido compound selected from the group consisting of succinimide and 5,5-dimethyl hydantoin by means of a solvent capable of dissolving said imido compound but substantially not dissolving the resulting γ-bromo-β-alkoxy crotonic acid ester, and (c) subjecting the remaining γ-bromo-β-alkoxy crotonic acid ester to fractional vacuum distillation.

13. The process according to claim 12, wherein the solvent used for extracting the formed imido compound in step (b) is water.

14. The process according to claim 12, wherein the bromination temperature in step (a) is a temperature between about 105° C. and about 115° C.

15. The process according to claim 12, wherein the β-alkoxy crotonic acid ester is a β-methoxy crotonic acid lower alkyl ester.

16. The process according to claim 12, wherein extraction of the formed imido compound in step (b) with water is carried out at a temperature between about 70° C. and about 80° C.

17. The process according to claim 12, wherein fractional vacuum distillation in step (c) is carried out without previous drying of the remaining γ-bromo-β-alkoxy crotonic acid ester.

18. The process according to claim 12, wherein the dilute mineral acid used for decomposing the organo-zinc salt is an aqueous about 10% hydrochloric acid.

19. In a process of producing kawain, the steps which comprise
(a) adding a brominating imido compound selected from the group consisting of N-bromo succinimide and 1,3-dibromo-5,5-dimethyl-hydantoin portion by portion to a β-methoxy crotonic acid lower alkyl ester at a temperature between about 105° C. and about 115° C. while stirring vigorously,
(b) cooling the reaction mixture to a temperature between about 70° C. and about 80° C.,
(c) adding water to the reaction mixture and stirring the mixture to dissolve the imido compound formed,
(d) separating the aqueous solution from the remaining reaction product and completely removing therefrom the imido compound by washing with water,
(e) subjecting the substantially imido compound-free bromination product to vacuum distillation to recover the resulting γ-bromo-β-methoxy crotonic acid lower alkyl ester,
(f) adding a mixture of said γ-bromo-β-methoxy crotonic acid lower alkyl ester and a cinnamic aldehyde compound selected from the group consisting of cinnamic aldehyde and cinnamic acetal, in an inert organic solvent to metallic zinc,
(g) heating the reaction mixture at about 80° C. to complete condensation,
(h) cooling the condensation mixture to 40–45° C.,
(i) adding the cooled condensation mixture to a dilute aqueous mineral acid solution,
(j) removing the precipitated kawain from the organic solvent solution and the dilute mineral acid, and
(k) washing said kawain to completely remove dilute mineral acid therefrom.

20. The process according to claim 19, wherein the dilute mineral acid used in step (1) is aqueous 10% hydrochloric acid.

21. In a process of producing methysticin, the steps which comprise
(a) adding a brominating imido compound selected from the group consisting of N-bromo succinimide and 1,3-dibromo-5,5-dimethyl hydantoin portion by portion to a β-methoxy crotonic acid lower alkyl ester at a temperature between about 105° C. and about 115° C. while stirring vigorously,
(b) cooling the reaction mixture to a temperature between about 70° C. and about 80° C.,
(c) adding water to the reaction mixture and stirring the mixture to dissolve the imido compound formed,
(d) separating the aqueous solution from the remaining reaction product and completely removing therefrom the imido compound by washing with water,
(e) subjecting the substantially imido compound-free bromination product to vacuum distillation to recover the resulting γ-bromo-β-methoxy crotonic acid lower alkyl ester,
(f) adding a mixture of said γ-bromo-β-methoxy crotonic acid lower alkyl ester and a cinnamic aldehyde compound selected from the group consisting of 3,4-methylenedioxy cinnamic aldehyde and 3,4-methylenedioxy cinnamic acetal in an inert organic solvent to metallic zinc,
(g) heating the reaction mixture at about 80° C. to complete condensation,
(h) cooling the condensation mixture to 40–45° C.,
(i) adding the cooled condensation mixture to a dilute aqueous mineral acid solution,
(j) removing the precipitated methysticin from the organic solvent solution and the dilute mineral acid, and
(k) washing said methysticin to completely remove dilute mineral acid therefrom.

22. The process according to claim 21, wherein the dilute mineral acid used in step (1) is aqueous 10% hydrochloric acid.

References Cited

Kostermanns, Rec. trav. chim. 70, 79–82 (1951).
Piantadosi et al., J. Pharm. Sci. 53(8), 902–5 (1964).

HENRY R. JILES, Primary Examiner

G. T. TODD, Assistant Examiner

PO-1050
(5/69)

UNITED STATES PATENT OFFICE
CERTIFICATE OF CORRECTION

Patent No. 3,576,801      Dated April 27, 1971

Inventor(s) HANS BRINKHOFF

It is certified that error appears in the above-identified patent and that said Letters Patent are hereby corrected as shown below:

Column 1, line 32: Change "of" to -- with --. Column 1, line 49: Change "or" to -- of --. Column 2, line 6: Change "or" to -- of --. Column 2, line 52: Change "o fhalogenating" to -- of halogenating --. Column 3, line 11: Change "wtih" to -- with --. Column 3, line 47: Change "solvent" to -- solvents --. Column 4, line 63: Change "tn" to -- an --. Column 5, line 64: Change "40.01" to -- 40.0 1. --. Column 5, line 68: Change "methyl" to -- methy --. Column 6, line 42: Change "6-styryl,5,6-digydro" to -- 6-styryl-5,6-dihydro --. Column 8, lines 8 and 46: Change "(1)" to -- (1) --.

Signed and sealed this 24th day of August 1971.

(SEAL)
Attest:

EDWARD M. FLETCHER, JR.
Attesting Officer

WILLIAM E. SCHUYLER, JR.
Commissioner of Patents